US010956205B2

(12) United States Patent
Bruce et al.

(10) Patent No.: US 10,956,205 B2
(45) Date of Patent: Mar. 23, 2021

(54) DATA PROCESSING

(71) Applicant: ARM Limited, Cambridge (GB)

(72) Inventors: Alistair Crone Bruce, Sheffield (GB); Andrew David Tune, Sheffield (GB)

(73) Assignee: ARM Limited, Cambridge (GB)

( * ) Notice: Subject to any disclaimer, the term of this patent is extended or adjusted under 35 U.S.C. 154(b) by 719 days.

(21) Appl. No.: 15/396,985

(22) Filed: Jan. 3, 2017

(65) Prior Publication Data

US 2018/0189097 A1 Jul. 5, 2018

(51) Int. Cl.
*G06F 9/46* (2006.01)
*G06F 9/54* (2006.01)
*G06F 13/16* (2006.01)
*G06F 3/00* (2006.01)
*G06F 11/07* (2006.01)

(52) U.S. Cl.
CPC .............. *G06F 9/467* (2013.01); *G06F 9/466* (2013.01); *G06F 9/544* (2013.01); *G06F 13/1663* (2013.01); *G06F 13/1673* (2013.01); *G06F 3/00* (2013.01); *G06F 11/076* (2013.01)

(58) Field of Classification Search
CPC .......... G06F 12/06; G06F 13/14; G06F 21/00; G06F 3/00; G06F 9/466; G06F 9/467; G06F 11/076; G06F 13/1663
See application file for complete search history.

(56) References Cited

U.S. PATENT DOCUMENTS

2009/0271583 A1* 10/2009 Kershaw ............ G06F 12/1491
711/163
2011/0072178 A1* 3/2011 Mace .................... G06F 13/161
710/244
2011/0125944 A1* 5/2011 Riocreux ............ G06F 13/1621
710/107
2012/0185062 A1* 7/2012 Saund .................... H04L 49/10
700/11
2013/0036465 A1* 2/2013 Chuan .................... G06F 21/85
726/22
2016/0103776 A1* 4/2016 Tune .................... G06F 13/4282
710/110

OTHER PUBLICATIONS

R. Jain et al, "Congestion Avoidance in Computer Networks With a Connectionless Network Layer," Copyright 1988, Version: Jun. 1, 1997, pp. 1-21.

* cited by examiner

*Primary Examiner* — Getente A Yimer
(74) *Attorney, Agent, or Firm* — Nixon & Vanderhye, P.C.

(57) ABSTRACT

Data processing apparatus comprises one or more transaction issuing devices configured to issue data processing transactions to be handled by a downstream device and to receive a completion acknowledgement in respect of each completed transaction; each transaction issuing device having associated transaction regulator circuitry configured to allow that transaction issuing device to issue transactions subject to a limit on a maximum number of outstanding transactions, an outstanding transaction being a transaction which has been issued but for which a completion acknowledgement has not yet been received; in which the downstream device is configured to issue an indication to a transaction issuing device, to authorize a change by the transaction regulator circuitry of the limit applicable to outstanding transactions by that transaction issuing device.

22 Claims, 12 Drawing Sheets

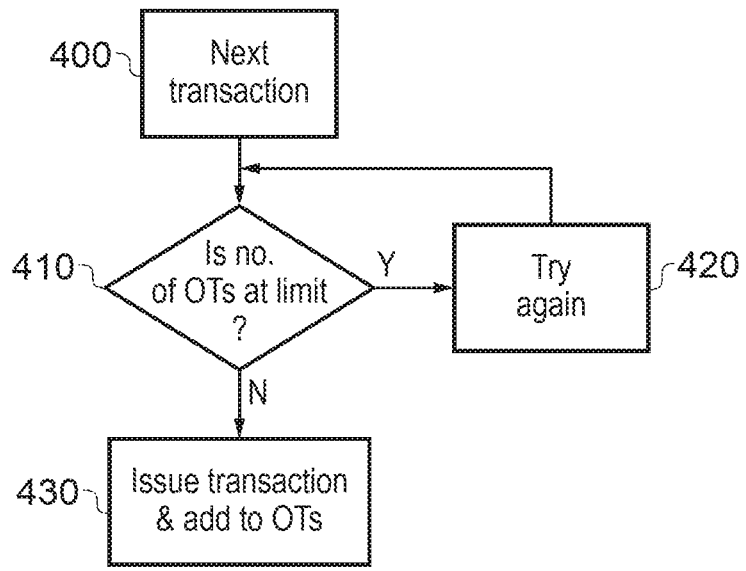
FIG. 4
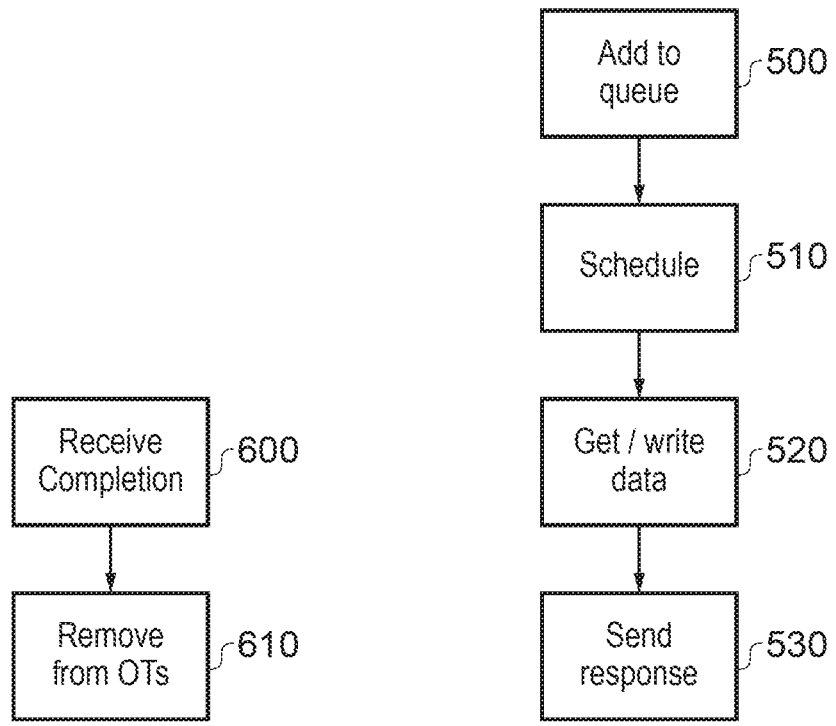
FIG. 6
FIG. 5

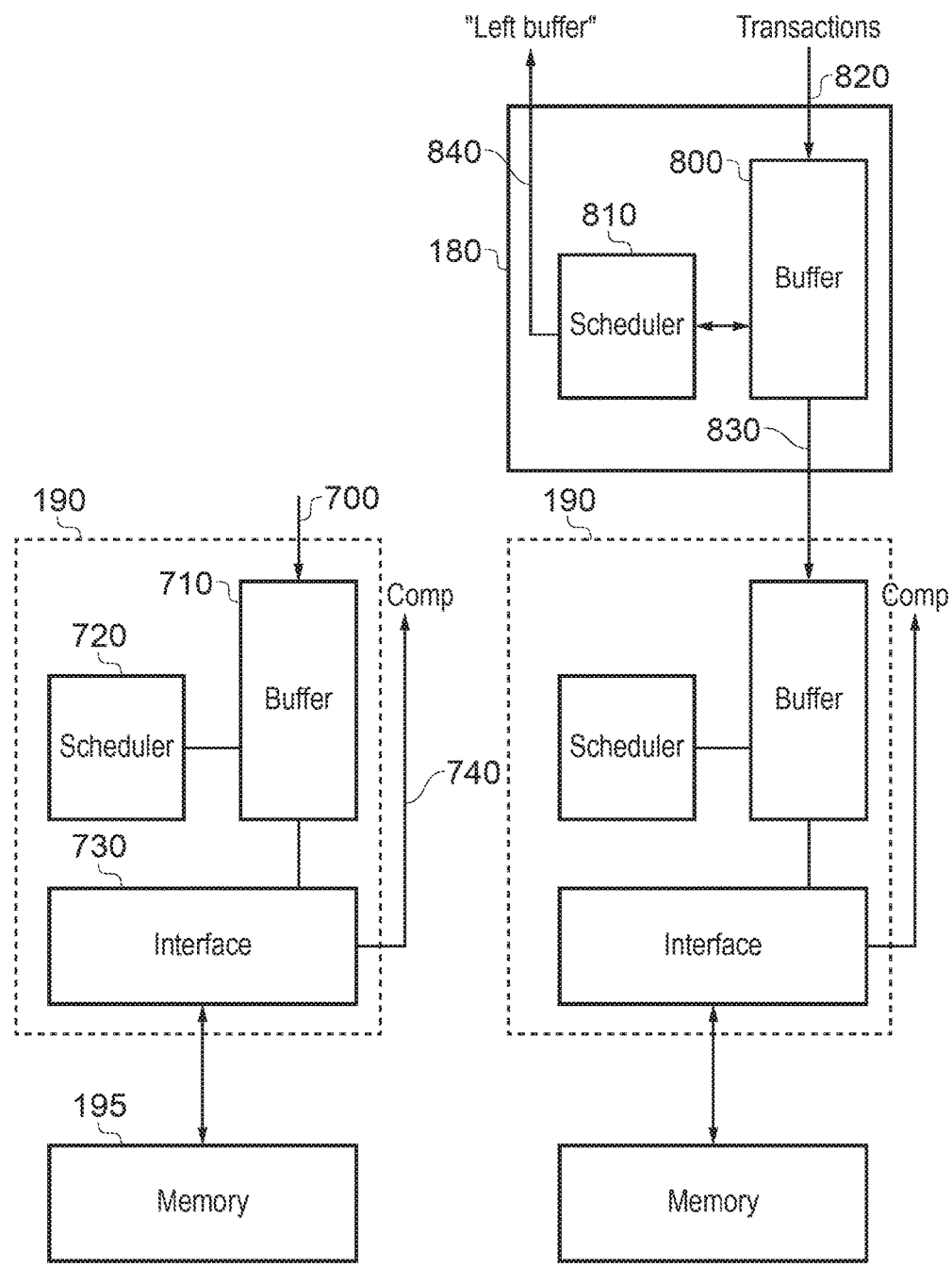

DATA PROCESSING

BACKGROUND

This disclosure relates to data processing

Some data processing systems make use of one or more initiator devices (as examples of transaction issuing devices) issuing data processing transactions to one or more downstream devices. An example is where a system includes one or more processors (as example initiator devices in this context) and one or more memory controllers (as example downstream devices in this context), connected by interconnect circuitry. Such a system may be embodied as (or in), for example, a so-called System-on-Chip (SoC) or Network-on-Chip (NoC), or as multiple discrete devices.

In such arrangements, it can be appropriate to maintain the number of outstanding (issued but yet to be completed) transactions at a level which achieves a balance between low throughput or bandwidth (which can occur if the downstream device does not have sufficient queued transactions to fill its pipelines, for example) and worsened latency (which can occur if there are too many queued transactions such that there can be a long delay between an individual transaction joining the queue and being serviced).

An outstanding transaction can represent a demand on the resources of a system including the communication channels of the interconnect carrying the request and any data, the resources of the memory controller to service the request, and the return channels of the interconnect to carry the response and any data. Regulating outstanding transactions therefore attempts to regulate the use of all these system resources.

Outstanding transaction regulation can involve regulating transactions by allowing the initiator device to issue transactions subject to a limit on a maximum number of outstanding transactions.

SUMMARY

In an example arrangement there is provided data processing apparatus comprising:

one or more transaction issuing devices configured to issue data processing transactions to be handled by a downstream device and to receive a completion acknowledgement in respect of each completed transaction;

each transaction issuing device having associated transaction regulator circuitry configured to allow that transaction issuing device to issue transactions subject to a limit on a maximum number of outstanding transactions, an outstanding transaction being a transaction which has been issued but for which a completion acknowledgement has not yet been received;

in which the downstream device is configured to issue an indication to a transaction issuing device, to authorise a change by the transaction regulator circuitry of the limit applicable to outstanding transactions by that transaction issuing device.

In another example arrangement there is provided a transaction issuing device comprising:

circuitry to issue data processing transactions to be handled by a downstream device and to receive a completion acknowledgement in respect of each completed transaction; and transaction regulator circuitry to allow that transaction issuing device to issue transactions subject to a limit on a maximum number of outstanding transactions, an outstanding transaction being a transaction which has been issued but for which a completion acknowledgement has not yet been received;

in which the transaction regulator circuitry is configured to change the limit applicable to outstanding transactions by that transaction issuing device in response to receipt of an indication from the downstream device authorising the change.

In another example arrangement there is provided a device comprising:

circuitry to handle data processing transactions from a transaction issuing device and to issue a completion acknowledgement in respect of each completed transaction; and circuitry to issue an indication to a transaction issuing device, to authorise a change by the transaction regulator circuitry of a limit applicable to outstanding transactions by that transaction issuing device.

In another example arrangement there is provided a data processing method comprising:

one or more transaction issuing devices issuing data processing transactions to be handled by a downstream device and receiving a completion acknowledgement in respect of each completed transaction;

regulating transactions by allowing the issue of transactions subject to a limit on a maximum number of outstanding transactions, an outstanding transaction being a transaction which has been issued but for which a completion acknowledgement has not yet been received;

the downstream device issuing an indication to a transaction issuing device, to authorise a change by the transaction regulator circuitry of the limit applicable to outstanding transactions by that transaction issuing device.

In another example arrangement there is provided a method of operation of a transaction issuing device, comprising:

issuing data processing transactions to be handled by a downstream device and receiving a completion acknowledgement in respect of each completed transaction;

regulating transactions by allowing the transaction issuing device to issue transactions subject to a limit on a maximum number of outstanding transactions, an outstanding transaction being a transaction which has been issued but for which a completion acknowledgement has not yet been received; and changing the limit applicable to outstanding transactions by that transaction issuing device in response to receipt of an indication from the downstream device authorising the change.

In another example arrangement there is provided a method of operation of a device, comprising:

handling data processing transactions from a transaction issuing device;

issuing a completion acknowledgement in respect of each completed transaction; and issuing an indication to a transaction issuing device, to authorise a change by the transaction regulator circuitry of a limit applicable to outstanding transactions by that transaction issuing device.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIGS. 4 to 6 are schematic flowcharts illustrating methods;

FIGS. 7 and 8 schematically illustrate downstream devices;

DESCRIPTION OF EMBODIMENTS

Figure 1:
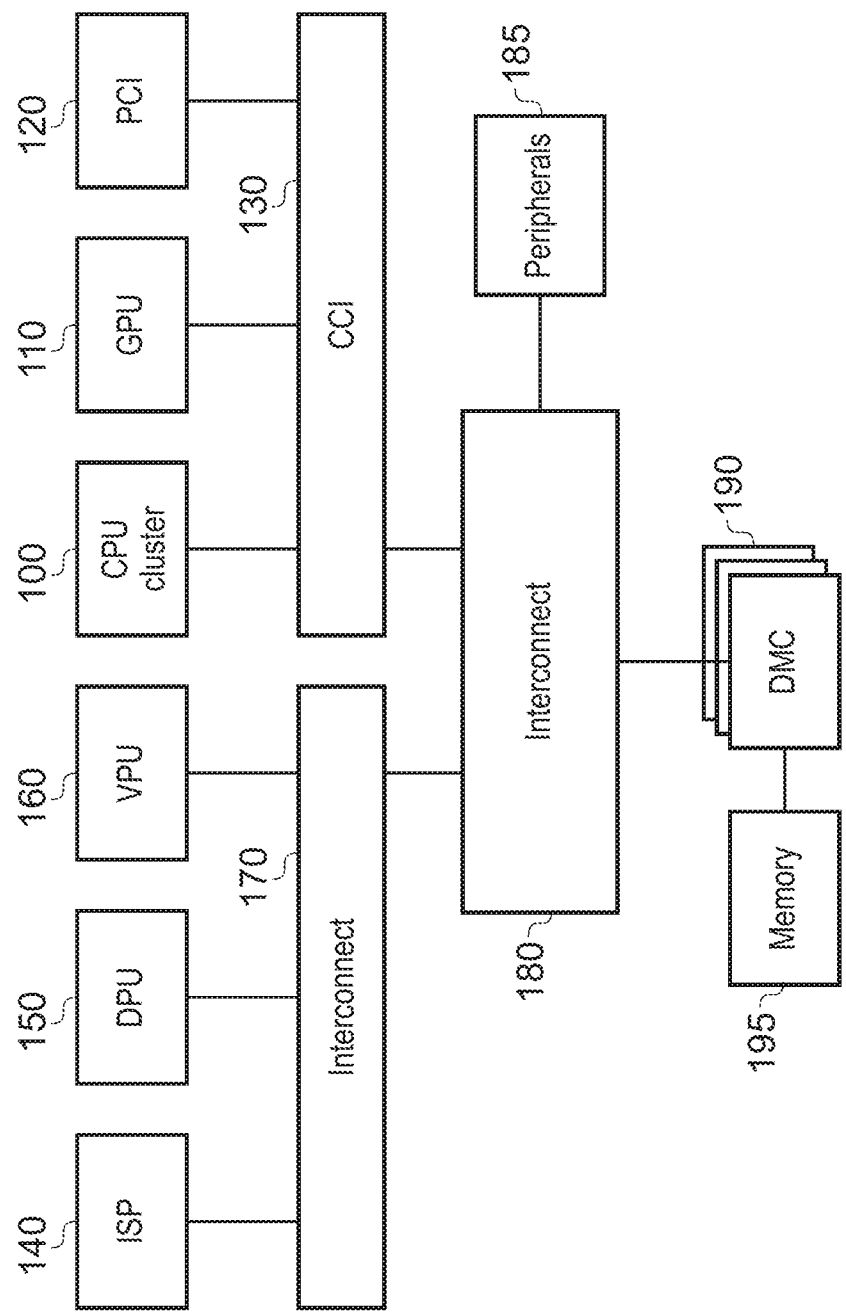
FIG. 1 schematically illustrates a data processing apparatus.

Before discussing the embodiments with reference to the accompanying figures, the following description of embodiments is provided.

An example embodiment provides data processing apparatus comprising:

one or more transaction issuing devices configured to issue data processing transactions to be handled by a downstream device and to receive a completion acknowledgement in respect of each completed transaction;

each transaction issuing device having associated transaction regulator circuitry configured to allow that transaction issuing device to issue transactions subject to a limit on a maximum number of outstanding transactions, an outstanding transaction being a transaction which has been issued but for which a completion acknowledgement has not yet been received;

in which the downstream device is configured to issue an indication to a transaction issuing device, to authorise a change by the transaction regulator circuitry of the limit applicable to outstanding transactions by that transaction issuing device.

The apparatus may comprise the downstream device.

Example arrangements allow for variation in a limit applicable to outstanding transactions at a transaction issuing device (such as an initiator device, for example a master node in a data handing network, or an intermediate device such as an interconnect) to be authorised by a downstream device. In this way, if one or more transaction issuing devices are relatively idle, system efficiency can potentially be maintained by allocating or at least authorising a greater outstanding transaction limit to other transaction issuing devices.

In an arrangement in which there are two or more transaction issuing devices, the downstream device may comprise:

a transaction buffer to store transactions which have been received from the two or more transaction issuing devices but which have not yet been completed; and detection circuitry to detect the occupancy of the transaction buffer;

in which the downstream device is configured to issue an indication to the at least one transaction issuing device in response to the detected occupancy of the transaction buffer.

In this way, the occupancy downstream can be used to control whether an authorisation is given to an upstream device.

Outstanding transaction regulation can be performed by a transaction issuing device by (for example) the following. When the number of outstanding transactions is equal to the limit, the transaction issuing device is configured to issue a next transaction in response to receipt of a completion acknowledgement. In examples, the indication comprises an authorisation for the regulator circuitry to increase the limit applicable to outstanding transactions by that transaction issuing device. For example, the authorisation can be indicative of an increment of a current limit applicable to outstanding transactions by that transaction issuing device.

In some examples, the regulator circuitry associated with a transaction issuing device is configured to increase the limit applicable to outstanding transactions by that transaction issuing device subject to a maximum limit value. This allows increases to be implemented but to be controlled so as not to increase without limit.

The regulator circuitry associated with a transaction issuing device may be configured to increase the limit applicable to outstanding transactions by that transaction issuing device when the number of outstanding transactions is equal to a current limit.

In examples, the regulator circuitry associated with a transaction issuing device is configured to increase the limit applicable to outstanding transactions by that transaction issuing device in response to an authorisation received since initiation of a preceding transaction. For example, to avoid additional traffic, the downstream device may be configured to issue a message to a transaction issuing device comprising a completion acknowledgement and the authorisation to increase the limit.

In some examples, the transaction issuing devices are configured to indicate a willingness to reduce their respective limits and to issue a request to the downstream device, to request an increase in the limit applicable to outstanding transactions issued by that transaction issuing device.

In examples, the downstream device is configured to send the authorisation to those transaction issuing devices which have issued a request to increase in the limit applicable to outstanding transactions issued by that transaction issuing device.

To avoid additional traffic, in examples the transaction issuing devices are configured to issue the request as part of a message initiating a transaction.

In order to provide a gradual reduction back down to an original outstanding transaction limit, in examples the regulator circuitry is configured to change the limit with respect to an initial limit value; and when the number of outstanding transactions is above the initial limit value and the downstream device has not issued an authorisation, the transaction issuing device is configured to issue a next transaction in response to receipt of n successive completion acknowledgements, where n is greater than one. In examples, the value of n is dependent upon a difference between a current number of outstanding transactions and the initial limit value.

In a system of multiple categories of transaction, the one or more transaction issuing devices may be configured to issue transactions relating to a transaction category selected from a group of two or more transaction categories; and the indication may be applicable to a limit relating to a subset of the transaction categories.

The indication may comprise a request for the regulator circuitry to reduce the limit applicable to outstanding transactions by that transaction issuing device. To avoid a transaction issuing device having too few outstanding transactions, in examples the regulator circuitry is configured to respond to the request when the number of outstanding transactions by that transaction issuing device is above a minimum threshold.

The transaction issuing device may be configured to indicate to the downstream device that it is able to reduce the limit applicable to outstanding transactions by that transaction issuing device when the number of outstanding transactions by that transaction issuing device is above the minimum threshold.

In examples, the downstream device is selected from the list consisting of: (i) a server device; and (ii) an interconnect. Examples of server devices include memory devices, memory controllers, a cache memory, a point of coherency such as a home node in a coherent network, and the like. In some examples, the downstream device is a memory device configured to handle a transaction by reading from or writing to one or more memory addresses. In other examples the downstream device may be an interconnect configured to buffer a transaction and configured to handle the transaction by forwarding the transaction from the buffer to another (further downstream) downstream device.

Another example embodiment provides a transaction issuing device comprising:

circuitry to issue data processing transactions to be handled by a downstream device and to receive a completion acknowledgement in respect of each completed transaction; and transaction regulator circuitry to allow that transaction issuing device to issue transactions subject to a limit on a maximum number of outstanding transactions, an outstanding transaction being a transaction which has been issued but for which a completion acknowledgement has not yet been received;

in which the transaction regulator circuitry is configured to change the limit applicable to outstanding transactions by that transaction issuing device in response to receipt of an indication from the downstream device authorising the change.

Another example embodiment provides a device comprising:

circuitry to handle data processing transactions from a transaction issuing device and to issue a completion acknowledgement in respect of each completed transaction; and circuitry to issue an indication to a transaction issuing device, to authorise a change by the transaction regulator circuitry of a limit applicable to outstanding transactions by that transaction issuing device.

Another example embodiment provides a data processing method comprising:

one or more transaction issuing devices issuing data processing transactions to be handled by a downstream device and receiving a completion acknowledgement in respect of each completed transaction;

regulating transactions by allowing the issue of transactions subject to a limit on a maximum number of outstanding transactions, an outstanding transaction being a transaction which has been issued but for which a completion acknowledgement has not yet been received;

the downstream device issuing an indication to a transaction issuing device, to authorise a change by the transaction regulator circuitry of the limit applicable to outstanding transactions by that transaction issuing device.

Another example embodiment provides a method of operation of a transaction issuing device, comprising:

issuing data processing transactions to be handled by a downstream device and receiving a completion acknowledgement in respect of each completed transaction;

regulating transactions by allowing the transaction issuing device to issue transactions subject to a limit on a maximum number of outstanding transactions, an outstanding transaction being a transaction which has been issued but for which a completion acknowledgement has not yet been received; and changing the limit applicable to outstanding transactions by that transaction issuing device in response to receipt of an indication from the downstream device authorising the change.

Another example embodiment provides a method of operation of a device, comprising:

handling data processing transactions from a transaction issuing device;

issuing a completion acknowledgement in respect of each completed transaction; and issuing an indication to a transaction issuing device, to authorise a change by the transaction regulator circuitry of a limit applicable to outstanding transactions by that transaction issuing device.

Referring now to the drawings, FIG. 1 schematically illustrates a data processing apparatus.

In FIG. 1, a number of so-called initiator devices are connected via an arrangement of interconnects to one or more downstream devices. The initiator devices are configured to issue data processing transactions to be handled by a downstream device and to receive a completion acknowledgement in respect of each completed transaction.

Here, the term "downstream" refers to a position in the transaction flow such that a transaction issued by a transaction issuing device such as an initiator device progresses "downstream" towards its target node, and the completion acknowledgement then progresses back "upstream" to the initiator device. More than one node may be present between the initiator device and the target node, and the position of these nodes in the transaction and acknowledgment routing can be such that they are (with respect to such routing) upstream or downstream of one another.

Therefore, the initiator devices of FIG. 1 are examples of transaction issuing devices. However, other examples of transaction issuing devices are also applicable to the present techniques and will be discussed below.

In FIG. 1, the initiator devices include (by way of example) a processing element such as a CPU or CPU cluster 100, a graphics processing unit (GPU) 110 and a peripheral component interconnect (PCI) unit 120, all of which operate in a data coherent manner and are connected via a cache coherent interconnect (CCI) 130.

In this context, the term "coherent" refers to the system of the initiators 100, 110, 120 and the CCI 130, and implies that data written to a memory address within the coherent memory system by one node of that system is consistent with data read from that memory address in the coherent memory system by another of the nodes. A role of logic associated with the CCI 130 is therefore to ensure that before a data handling transaction takes place, if the version of the data item to be accessed is out of date (for example, because of a modification made to another copy of the same data item), the copy to be accessed is first brought up to date or is invalidated. Similarly, if the data handling transaction involves modifying a data item, then logic associated with the CCI 130 avoids conflicts with other existing copies of the data item.

The initiator devices 100 . . . 120 may be "fully coherent", which implies that they have an associated cache memory which can store copies of data items, or may be "input/output coherent" which implies that they do not have such an associated cache memory.

Other initiator devices in FIG. 1 include an image signal processor (ISP) 140, for example a signal processor associated with a camera (not shown), a display processing unit (DPU) 150 and a video processing unit (VPU) 160. In FIG. 1, these initiator devices 140 . . . 160 are shown as being non-coherent devices and are connected together by an interconnect 170.

A potential issue associated with initiator devices such as the VPU 160 and the DPU 150 is the need for continuous access to data, for example to allow for the decoding of video content and its preparation for display on a display device (not shown). If there is a so-called data stall or bottleneck (implying a sudden increase in the latency or delay associated with the DPU 150 or the VPU 160 obtaining data items from, for example, a memory), this can lead to an undesirable interruption in the displayed replay of the video content.

The interconnect 130 and the interconnect 170 are themselves connected by an interconnect 180 to which one or more peripheral devices 185 may be connected. The interconnect 180 is also connected to one or more dynamic memory controllers (DMC) 190 associated with a main memory 195.

More than one DMC device 190 can be provided so as to allow for interleaved access to the memory system 195. This can spread the processing and/or data transfer load associated with large memory accesses amongst several devices. The DMCs have their own scheduler with read queues and write queues, to allow for the fact that all of the initiator devices share the DMCs 190.

The apparatus of FIG. 1 can be implemented using a so-called network on chip (NoC) (for example providing one or more of the interconnects 130, 170, 180), a so-called system on chip (SoC) or as multiple discrete devices.

The interaction of the transaction issuing devices and the memory system involves a transaction issuing device issuing a transaction request for a data processing transaction. The transaction request is handled by one or more downstream devices and eventually a completion acknowledgement in respect of a completed transaction is returned to the transaction issuing device. Once a transaction has been issued, it is an "outstanding transaction" from the point of view of the transaction issuing device. It remains as an outstanding transaction until the completion acknowledgement is received back by the transaction issuing device.

As an example, a data read request may be issued by one of the initiator devices relating to the reading of data from a particular memory address in the memory 195. The read request may include an address indicating the memory address to be accessed, and which also can be used by the various interconnects to provide routing of the request to the appropriate DMC(s) and memory 195, data indicating a size of the portion of the memory to be read, data indicating a permission associated with the request and an identifier. The identifier can provide information relating to the ordering of the request relative to other requests, and can also include routing data, such as data defining a source identifier indicating which initiator device issued the request. The source identifier can be used later to provide routing (back to the initiator device) of the requested data and of the completion acknowledgement.

The read request is passed from the initiator device to the interconnect 170, 130 as appropriate, from there to the interconnect 180, from there to the DMC 190 where it is added to a read queue. In due course, the request is scheduled by the DMC 190, a response is obtained from the memory 195 and the request data is returned via the interconnect 180 and the interconnect 130 or 170 to the initiator device.

In the case of a read request, the last item of the data which was requested can be considered as the completion acknowledgement. However, in other examples, a separate completion acknowledgement could be sent after the last item of requested data has been passed to the initiator device.

Generally, a completion response is given when the requested service has been completed from a system perspective. For example, a write to memory can be given a completion response once all the data has been entered into a cache accessible by later read requests even though it has not actually been written to memory.

Considering a data write, a write request can be formed of an initial request defining the data to be written, followed by the data itself which can be transmitted from the initiator device to the memory 195 by the same route as the request or by a different route. In the case of a write request, the data itself is passed from the initiator device to the target downstream device, but the initiator device does await a completion response routed back to the initiator device by using, for example, an indication of a source ID in the original request. In the case of the so-called AXI protocol, the completion response may be referred to as a "B response".

So, in terms of read and write transactions, a completion response may take the form of an indication that the last of the requested data items has been read and returned (in the case of a read request) or the B response or a similar completion acknowledgement (in the case of a write request). Until that response is received by the initiator device, the transaction is "outstanding". When that response has been received, the outstanding transaction has been completed and is no longer "outstanding".

Other types of transaction (subject to outstanding transaction regulation as discussed below) can also be implemented, which involve an initiator initiating the transaction and a response subsequently being provided. For example, in a coherent memory system, one or more nodes in the system can act as a so-called home node acting as a controller to manage communication amongst the nodes and with memory. Other nodes send their transaction requests to the home node which serialises them and implements them in the serialised order. So in this context the other nodes could act as initiators and the home node as a server for that type of transaction. The home node maintains details of which memory addresses are cached at the various nodes. To implement the coherency function, other types of transactions might be initiated by the home node and responded to by another node or the cache at another node, so that in this context the home node could be the initiator and the other node or its cache would act as the server. Examples of this type of transaction include the home node (acting as initiator) requesting a copy of particular data held at one node (because the home node knows that this is the latest copy of that data) in order that the home node may in turn (acting as server) provide it to another requesting node. Or the home node could send a transaction request to another node to request (as initiator) that the other node (as server) invalidates particular cached data. The other node would return an acknowledgement when the transaction to invalidate the data has been completed.

Therefore, examples of server devices include memory devices, memory controllers, a cache memory, a point of coherency such as a home node in a coherent network, and the like.

Generally speaking, at least some of the transaction issuing devices may have an intrinsic limit on the number of outstanding transactions which they can handle, for example the number of outstanding transactions for which ordering information (allowing the ultimate responses to be re-ordered into the correct order) can be maintained at that transaction issuing device. In terms of the DMCs 190, there can be a limit on the number of outstanding transactions which can be buffered and queued at the DMCs. If more than that number of outstanding transactions are pending, the queueing at the DMCs can extend into the interconnect 180, which can block buffers and other circuitry associated with the interconnect 180. This blockage can inhibit the transmission of subsequent requests and so lead to a potential bottleneck in the handling of transactions. For example, transactions from the DPU (which, as mentioned above, requires continuous data access in order to provide real-time display of content such as video content) could be blocked even if the DMCs 190 were able to handle the transactions, because of a blockage of buffers at the interconnect 180 owing to an excess of outstanding transactions from another transaction issuing device. So, this type of stalling of transactions can be a significant issue and can apply to unrelated data traffic if portions of the interconnect circuitry are blocked by an excess of outstanding transactions. Note also that the data channel used for the completion acknowledgements is just as important as the forward transaction channel in the context of avoiding stalling, because if a completion acknowledgement cannot be sent upstream towards the original transaction issuing device, an outstanding transaction at that transaction issuing device cannot be cleared in order to allow another transaction to be issued.

In order to address these issues, so-called outstanding transaction regulation (OTR) is employed in some arrangements of the type shown in FIG. 1.

Outstanding transaction regulation allows the system designer to allocate a number of allowable outstanding transactions to each transaction issuing device. As a device issues a transaction, the number of outstanding transactions at that device is increased by one, and when the outstanding transaction limit is reached, further transactions may not be initiated until one of the outstanding transactions is removed by virtue of receiving a completion acknowledgement.

Figure 2:
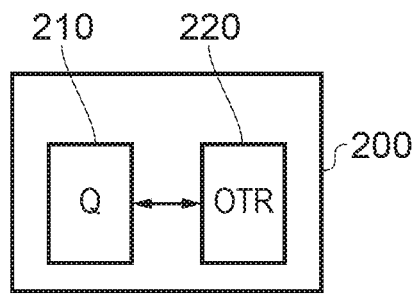
FIG. 2 schematically illustrates a transaction issuing device.

Outstanding transaction regulation can take place at a transaction issuing device, at an interconnect or other intermediate device, or both. By way of example, FIG. 2 schematically illustrates a transaction issuing device 200 having a transaction queue 210 and outstanding transaction regulation (OTR) circuitry 220. The operation of the OTR circuitry 220 will be discussed below, but it serves to avoid the number of outstanding transactions held in the queue 210 exceeding a limit associated with the transaction issuing device 200.

Figure 3:
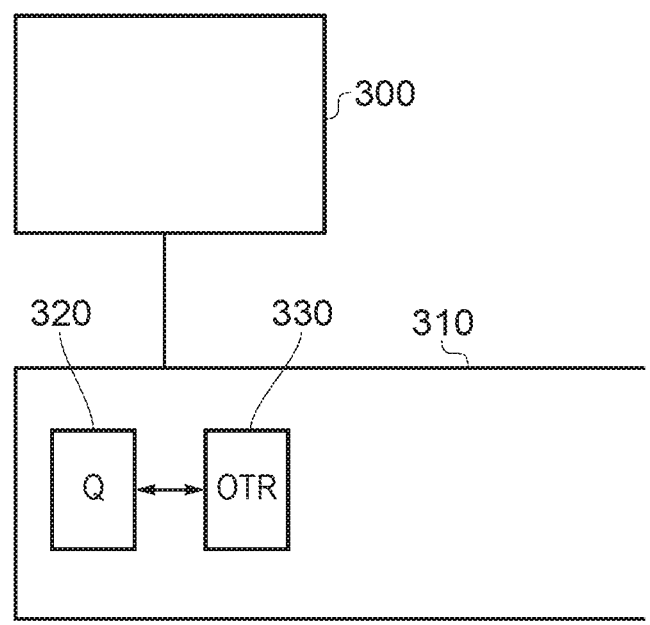
FIG. 3 schematically illustrates a transaction issuing device and a part of an interconnect.

In FIG. 3, an initiator device 300 issues transactions to an interconnect (part of which is shown as 310) having a queue 320 and OTR circuitry 330 associated with that initiator device 300. When the queue 320 contains a number of outstanding transactions equal to the outstanding transaction limit, the OTR circuitry 330 inhibits the initiator device 300 from issuing a further transaction to the queue 320. So, the OTR circuitry can be associated with an initiator without necessarily being a part of that initiator.

FIGS. 4 to 6 are schematic flowcharts illustrating methods relating to outstanding transaction regulation.

FIG. 4 schematically illustrates a method relating to the operation of OTR circuitry 220, 330 and the way in which it controls the issue of transactions by the relevant transaction issuing device.

At a step 400, a next transaction is prepared by the transaction issuing device for issue.

At a step 410, the OTR circuitry detects whether the number of existing outstanding transactions is at the outstanding transaction limit associated with that transaction issuing device. If the answer is yes then control passes to a step 420 to re-attempt the issue of the transaction at the step 410. In other words, the transaction will not be issued until (as a negative outcome from the step 410) the number of outstanding transactions is no longer at the limit. The number of outstanding transactions will drop below the limit in response to a completion acknowledgement being received in respect of one of the outstanding transactions.

As the negative outcome from the step 410, control passes to a step 430 at which the transaction prepared at the step 410 is issued and is added to the set of outstanding transactions.

FIG. 4 therefore provides an example in which, when the number of outstanding transactions is equal to the limit, the transaction issuing device is configured to issue a next transaction in response to receipt of a completion acknowledgement.

FIG. 5 relates to the handling of a transaction by a downstream device. Here, the downstream device could be the DMCs 190 and memory 195, but a downstream device may also be considered as one of the interconnects or another device between the initiator and the ultimate target device.

At a step 500, a transaction is added to a queue for handling, and at a step 510 the transaction is scheduled for execution. At a step 520, the data relating to the transaction is either obtained (for a read transaction) or written (for a write transaction) and at a step 530 a response and a completion acknowledgement are sent back towards the transaction issuing device.

At the OTR circuitry associated with the transaction issuing device, referring to FIG. 6, at a step 600 a completion acknowledgement is received and at a step 610 the relevant transaction is removed from the set of outstanding transactions.

The outstanding transaction regulation system discussed above is generally considered as being stable as long as a buffer capacity of a downstream device is not exceeded. However, the present disclosure recognises that in some situations the efficiency of handling transactions can be affected by one or more initiator or other transaction issuing devices being (at least relatively) idle, in that they are not issuing transactions at a sufficiently high rate to maintain utilisation of their outstanding transaction limit. This can lead to inefficient operation, for example if there are in fact insufficient outstanding transactions at the DMCs in order to fill their operation pipelines.

In example arrangements, the outstanding transaction limit applicable to an idle device can potentially be redistributed on a dynamic basis to one or more other busier devices. In this way, the apparatus of FIG. 1 provides an example of a data processing apparatus comprising: one or more transaction issuing devices configured to issue data processing transactions to be handled by a downstream device and to receive a completion acknowledgement in respect of each completed transaction; each transaction issuing device having associated transaction regulator circuitry configured to allow that transaction issuing device to issue transactions subject to a limit on a maximum number of outstanding transactions, an outstanding transaction being a transaction which has been issued but for which a completion acknowledgement has not yet been received; in which the downstream device is configured to issue an indication to a transaction issuing device, to authorise a change by the transaction regulator circuitry of the limit applicable to outstanding transactions by that transaction issuing device.

FIG. 7 schematically illustrates a downstream device, which in this example, is a DMC 190.

The DMC receives transactions by an input 700 and stores them in a buffer 710. A scheduler 720 schedules the transactions for execution. Executing a transaction involves controlling an interface 730 to access the memory 195 either as a read operation or a write operation. Once the transaction has been executed, a return path 740 carries one or both of the requested data (in the case of a read transaction) and a completion acknowledgement. The completion acknowledgement can be routed back to the initiating device as discussed above.

In other examples, OTR mechanisms can also be used to control the passage of transactions between nodes so that in the route between an initiator and eventual target, OTR regulation can be used to control whether a transaction, buffered at one stage in its route, is allowed to be issued or passed on to a next or later stage in the route. In this context, a relatively upstream device which uses OTR mechanisms of the type discussed here can be considered as a transaction issuing device, even if it was not the original initiator of the transaction. A relatively downstream device which responds to transaction requests with indications of the type discussed here can be considered as a server even if it is not the ultimate target of the transaction. So, transaction propagation between an original initiator and an ultimate target can be treated, using the present techniques, as one or more "hops" or transfers, each controlled by OTR, with the upstream device (of the type discusses here) being considered as the transaction issuing device for that hop, and the downstream device being considered as the server for that hop, for example implementing an adaptor of the type discussed below. In examples, an interconnect can act as a transaction issuing device or a server in this context. The interconnect may be configured (as in FIG. 8 below) to buffer a transaction and configured to handle the transaction by forwarding the transaction from the buffer to another downstream device, so that the completion acknowledgement is a "left the buffer" indication.

FIG. 7 therefore provides an example in which the downstream device comprises a transaction buffer to store transactions which have been received from the two or more transaction issuing devices but which have not yet been completed; and detection circuitry to detect the occupancy of the transaction buffer;

in which the downstream device is configured to issue an indication to the at least one transaction issuing device in response to the detected occupancy of the transaction buffer.

Referring to FIG. 8, in addition to the arrangement shown in FIG. 7, a part of the interconnect 180 is shown containing a buffer 800 and a scheduler 810. Transactions are received by the buffer via an input 820 and are held in the buffer until they are passed forward to the DMC 190 by an output 830. The scheduler 810 controls the scheduling of passing transactions from the buffer 800 onwards to a subsequent downstream node (in this example, the DMC 190) and, when a transaction is passed forward via the output 830, issues a "left buffer" signal 840 to indicate that the buffer 800 now has capacity for another transaction to be stored. In this way, the "left buffer" signal can be used as a completion acknowledgement (for that hop) to allow another transaction to be passed down to the interconnect 180 from an upstream device.

Figure 9A:
FIGS. 9a and 9b schematically illustrate a memory read request and a response.
Figure 9B:
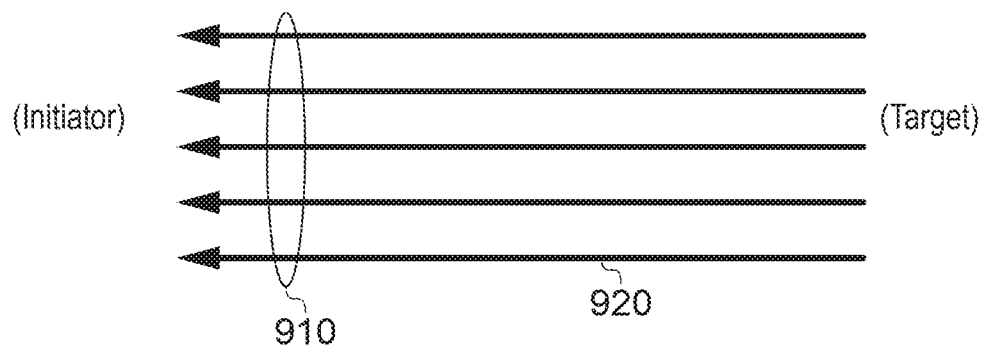

FIGS. 9A and 9B schematically illustrate a memory read request and a response.

The read request is issued as a request packet 900 from an initiator to a target node such as the DMC 190. The read data 910 is returned in response to the read request, with a last data item 920 being flagged to indicate completion of the request.

Figure 10A:
FIGS. 10a and 10b schematically illustrate a memory read request and a response.
Figure 10B:

FIGS. 10A and 10B schematically illustrate a memory write request and a response.

The memory write request is issued from the initiator to the target and comprises a write request packet 1000 accompanied by or followed by the data to be written 1010. Once the write operation has taken place, an acknowledgement of the type discussed above 1020 is returned.

Techniques for modifying the limit values associated with outstanding transaction regulation will now be discussed.

Figure 11:
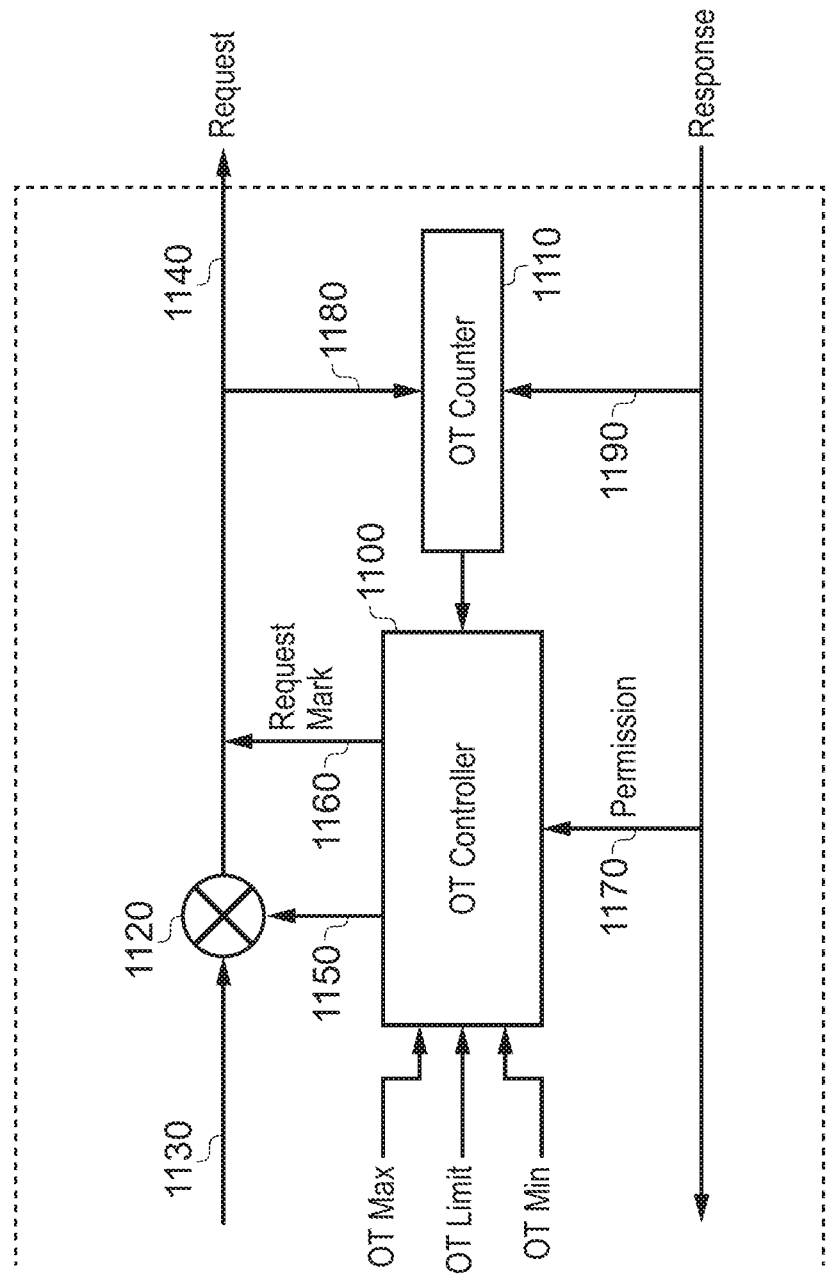
FIG. 11 schematically illustrates a part of transaction regulator circuitry.

FIG. 11 schematically illustrates a part of OTR circuitry such as that shown in FIGS. 2 and 3. This comprises an OT (outstanding transaction) controller 1100, an OT counter 1110 and a request data modifier 1120. The request data modifier 1120 is configured to allow or disallow a request 1130 to be issued as an output request 1140 to a downstream device in dependence upon a control signal 1150 issued by the OT controller 1100.

The OT controller 1100 is also configured to issue a request "mark" signal 1160 which is combined with the request, for example in an ID or accompanying field, as a separate control line or the like to form the output request 1140. The OT controller is also responsive to a permission indication 1170 which will be discussed below and which authorises a change by the transaction regulator circuitry of the limit applicable to outstanding transactions by that transaction issuing device, and to (up to) three threshold values, OT max, OT limit and OT min.

The OT counter 1110 acts to count outgoing requests via an input 1180 and incoming completion acknowledgements via an input 1190. The OT counter provides an indication to the OT controller 1100 of the net difference between these two counts, or in other words the current number of OTs.

The threshold values are such that OT min is less than (or equal to) OT limit which in turn is less than (or equal to) OT max. OT limit represents the default limit on a number of outstanding transactions imposed, for example, by the system designer or at boot of the apparatus.

The "request mark" 1160 can indicate to the downstream device either that the OT controller 1100 is requesting permission to increase the number of OTs (which, for example, the OT controller might indicate when the number of OTs is at or above the OT limit), and/or that the OT controller 1100 is offering to reduce its number of OTs (which, for example, the OT controller might indicate when the number of OTs is below OT limit but at least as high as OT min). In this way, the transaction issuing devices are configured to issue the request as part of a message initiating a transaction.

The downstream device can send (for example in response to such marked transactions, and/or in response to loading or other factors at the downstream device) a so-called permission, for example as part of a completion acknowledgement, indicating whether the number of OTs for that transaction issuing device can be increased. When a transaction issuing device that has reached OT limit receives such a permission, it can (in response to the completion acknowledgement which accompanied the permission) send two (or another number of) transaction requests instead of one. This has the effect of increasing the number of OTs for that transaction issuing device to a level higher than the OT limit. If the device receives further permissions its number of OTs will continue to increase—though in examples, the number of OTs is capped at a higher threshold level OT max. Requests are marked (by the mark 1160) whenever a transaction issuing device is operating at above its OT limit level.

The permission therefore provides an example of an indication comprising an authorisation for the regulator circuitry to increase the limit applicable to outstanding transactions by that transaction issuing device. The authorisation may be indicative of an increment of a current limit applicable to outstanding transactions by that transaction issuing device.

In examples, unused permissions are not accumulated. So, if the transaction issuing device does not have one or more additional transactions to issue as requests when a permission is received, or if the transaction issuing device has a number of OTs lower than OT limit, the permission is simply ignored.

The downstream device can respond to a drop in the number of OTs for a particular idle or partly idle transaction issuing device by issuing permissions to one or more other transaction issuing devices. These can be targeted at particular other transaction issuing devices or broadcast to all communicating transaction issuing devices. When the idle transaction issuing device resumes its normal operation, the downstream device can cease giving permissions to the other devices. As discussed below, this will have the effect of reducing their number of OTs back down to the respective OT limit.

When a transaction issuing device has a number of OTs greater than its OT limit, when a response is received with a permission, two (or another number of) requests can be sent, subject to the upper maximum number of OTs, OTmax. In this way, regulator circuitry associated with a transaction issuing device is configured to increase the limit applicable to outstanding transactions by that transaction issuing device subject to a maximum limit value. The regulator circuitry associated with a transaction issuing device may be configured to increase the limit applicable to outstanding transactions by that transaction issuing device when the number of outstanding transactions is equal to a current limit OT limit.

However, when the transaction issuing device has a number of OTs greater than its OT limit and a response is received with a permission, then in an example arrangement two responses must be received before a next request can be sent. The value of two is just an example; a value n could be used, where n is an integer greater than one, or indeed a non-integer (such that, for example, the device awaits two responses, then next time awaits three responses, giving an overall value of n=2.5). The value of n can vary according to how many OTs are in excess of OT limit, for example being larger for higher differences over OT limit. In other words, the value of n may be dependent upon a difference between a current number of outstanding transactions and the initial limit value OT limit.

The discussion above related to an absence of a permission to increase the number of OTs. In other examples, as well as or instead of the permissions, the downstream device can request a reduction in the number of OTs, for example as part of balancing an increased need from another transaction issuing device. This provides an example in which the indication comprises a request for the regulator circuitry to reduce the limit applicable to outstanding transactions by that transaction issuing device. The regulator circuitry may be configured to respond to the request when the number of outstanding transactions by that transaction issuing device is above a minimum threshold OT min.

When a transaction issuing device is above OT min and receives a reduction response, once again it must wait for n responses before issuing another request. The value n can be defined as discussed above.

The permission may be implemented by the regulator circuitry associated with a transaction issuing device being configured to increase the limit applicable to outstanding transactions by that transaction issuing device in response to an authorisation received since initiation of a preceding transaction. For example, the downstream device may be configured to issue a message to a transaction issuing device comprising a completion acknowledgement and the authorisation to increase the limit.

The circuitry of FIG. 11 could be a part of a node such as the node 200 of FIG. 2. The circuitry of FIG. 11 could be part of an interconnect 310 as shown in FIG. 3. The circuitry of FIG. 11 could be a part of an adaptor as discussed with reference to FIG. 13 below.

FIG. 11 provides an example of a transaction issuing device comprising:

circuitry to issue data processing transactions to be handled by a downstream device and to receive a completion acknowledgement in respect of each completed transaction; and transaction regulator circuitry to allow that transaction issuing device to issue transactions subject to a limit on a maximum number of outstanding transactions, an outstanding transaction being a transaction which has been issued but for which a completion acknowledgement has not yet been received;

in which the transaction regulator circuitry is configured to change the limit applicable to outstanding transactions by that transaction issuing device in response to receipt of an indication from the downstream device authorising the change.

Figure 12:
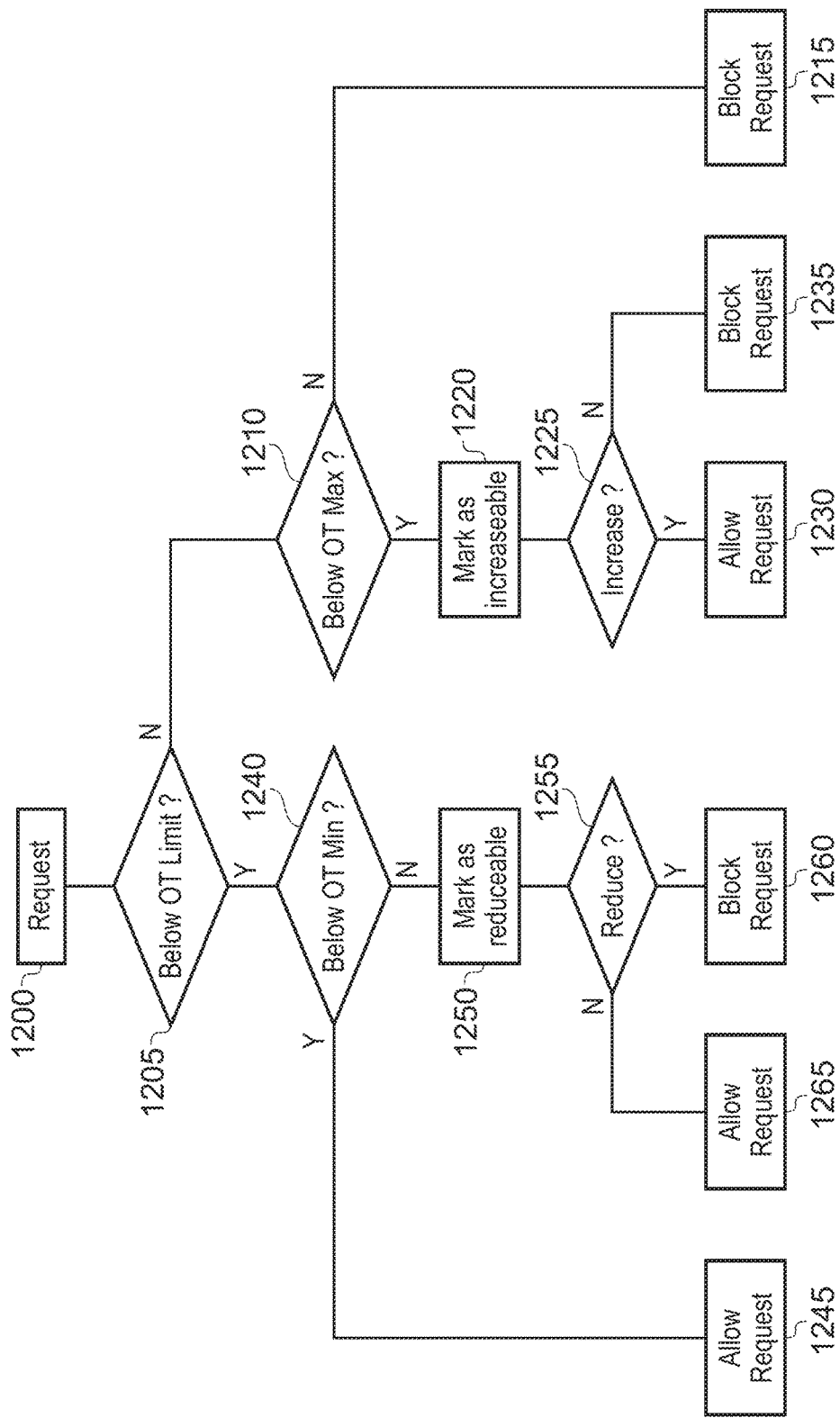
FIG. 12 is a schematic flowchart illustrating a method.

These example arrangements are shown in the schematic flowchart of FIG. 12. Referring to FIG. 12, when a request is provided on the input 1130 at a step 1200, the OT controller detects whether the current number of outstanding transactions as detected by the OT counter is below the threshold OT limit (at a step 1205). If the answer is no then control passes to a step 1210 at which the OT controller detects whether the current number of outstanding transactions is below the higher threshold OT max. If the answer is no then at a step 1215 the request is blocked by the modifier 1120, at least until this situation changes.

On the other hand, if the answer is yes at the step 1210 then at a step 1220 the OT controller marks the request as "OT limit may be increased" (in effect, a request to increase the number of OTs), as an example of the transaction issuing devices being configured to issue a request to the downstream device, to request an increase in the limit applicable to outstanding transactions issued by that transaction issuing device. The OT controller detects whether permission 1170 has been received to increase the OT limit. If an increase is allowed at a step 1225 then the request is allowed and is forwarded as an output 1140 at a step 1230. If not then the request is blocked at a step 1235.

Returning to the step 1205, if the current number of outstanding transactions is below OT limit then at a step 1240 the OT controller detects whether the current number is below OT min. If the answer is yes then the request is allowed at a step 1245. If the answer is no then this implies that the current number of outstanding transactions is between OT min and OT limit. At a step 1250, the OT controller prepares a request marked (1160) to indicate that the limit is reduceable. The OT controller then determines whether to reduce the limit at a step 1255 (for example, detecting whether a reduction has been signalled in the latest received response and if the current number of OTs is at least at OT min); if the answer is yes then the request is blocked at a step 1260 and if the answer is no the request is allowed at a step 1265. This arrangement provides an example in which the transaction issuing device is configured to indicate to the downstream device that it is able to reduce the limit applicable to outstanding transactions by that transaction issuing device when the number of outstanding transactions by that transaction issuing device is above the minimum threshold.

Figure 13:
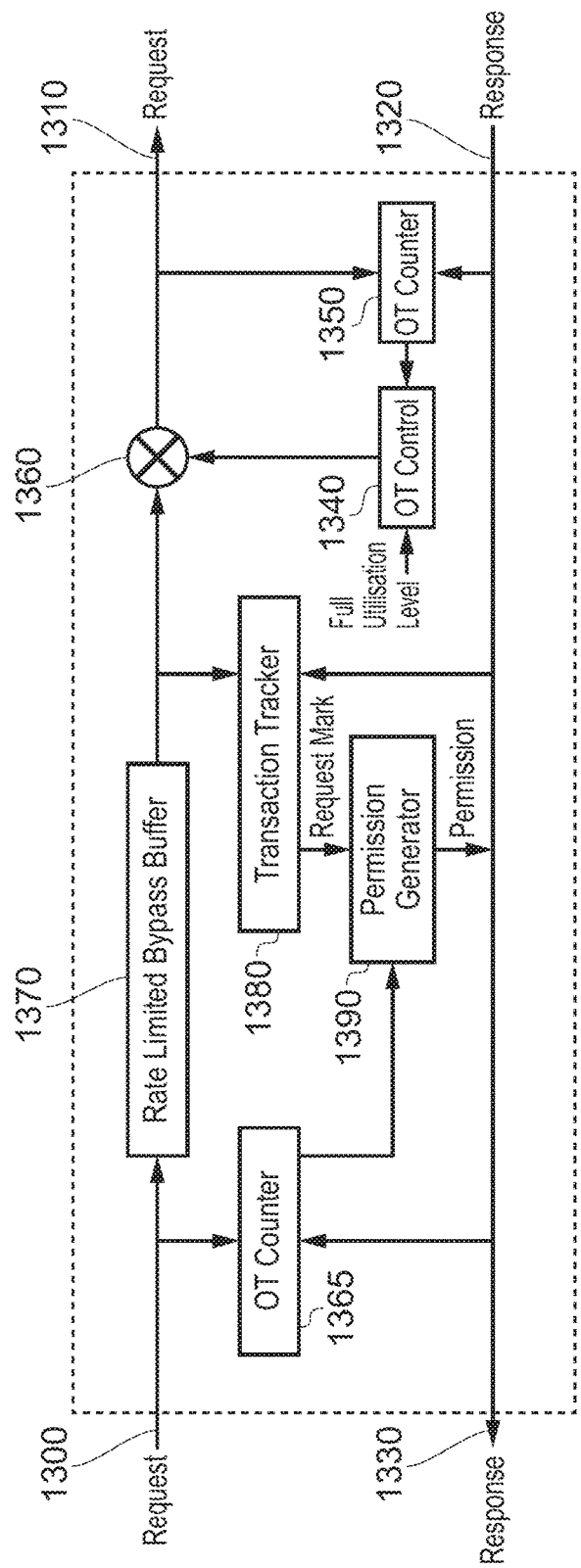
FIG. 13 schematically illustrates a part of a downstream device.

FIG. 13 schematically illustrates part of a downstream device such as a server (an example being the DMCs 190) or an adaptor which can be placed upstream of the target downstream device or server, for example as part of an interconnect. In some examples, the downstream device is a memory device configured to handle a transaction by reading from or writing to one or more memory addresses.

FIG. 13 therefore represents an example of a device comprising circuitry to handle data processing transactions from a transaction issuing device and to issue a completion acknowledgement in respect of each completed transaction; and circuitry to issue an indication to a transaction issuing device, to authorise a change by the transaction regulator circuitry of a limit applicable to outstanding transactions by that transaction issuing device.

FIG. 13 shows a request input 1300, a request output 1310, a response input 1320 and a response output 1330. An OT controller 1340 is responsive to an OT counter 1350 which determines the number of outstanding transactions, to allow or disallow requests by a modifier 1360. Other features shown are a further OT counter 1365, a rate limited bypass buffer 1370, a transaction tracker 1380 and a permission generator 1390. Operation of these features will be discussed below.

The circuitry of FIG. 13 tracks requests as they are passed to the server and modifies the responses according to the request marks and the OT level at the server. If the server does not have the capacity to receive a further request then the circuitry of FIG. 13 can provide additional buffering by the rate limited bypass buffer 1370.

The OT controller 1340 and the OT counter 1350 provide an OT control mechanism similar to that described above, aiming to maintain the server at a "full utilisation level" of OTs, being a number of OTs that can be buffered at the server and which provide full usage of the server pipelines.

The OT counter 1365 determines whether permissions can be provided as discussed above, for example in response to the occupancy of the buffer 1370 and/or the buffer 710 so that the buffer 1370 and/or the buffer 710 provide an example of a transaction buffer to store transactions which have been received from the two or more transaction issuing devices but which have not yet been completed. The OT counter provides an example of detection circuitry to detect the occupancy of the transaction buffer. The downstream device is configured to issue an indication to the at least one transaction issuing device in response to the detected occupancy of the transaction buffer. If the buffer occupancy is larger than a first particular level at the downstream device, one or more transaction issuing devices can be requested or instructed to reduce their OT limits. If the buffer occupancy is smaller than a second particular level at the downstream device (which may be the same as or different to the first particular level) then one or more transaction issuing devices can be instructed or requested to increase their OT limit.

If so, permissions are generated by the permission generator 1390 to be marked on transaction responses. The transaction tracker 1380 enables the permissions to be marked on appropriate transaction responses for the transaction issuing device in question.

The adaptor of FIG. 13 can operate in connection with an intermediate position between the transaction issuing device and the server. In providing its own buffering, it can itself regulate the flow of transactions in a downstream direction and responses in an upstream direction, by awaiting permissions from a downstream device (downstream relative to the adaptor) and providing OT regulation of (and buffering of, if necessary) transactions from an upstream device.

Figure 14:
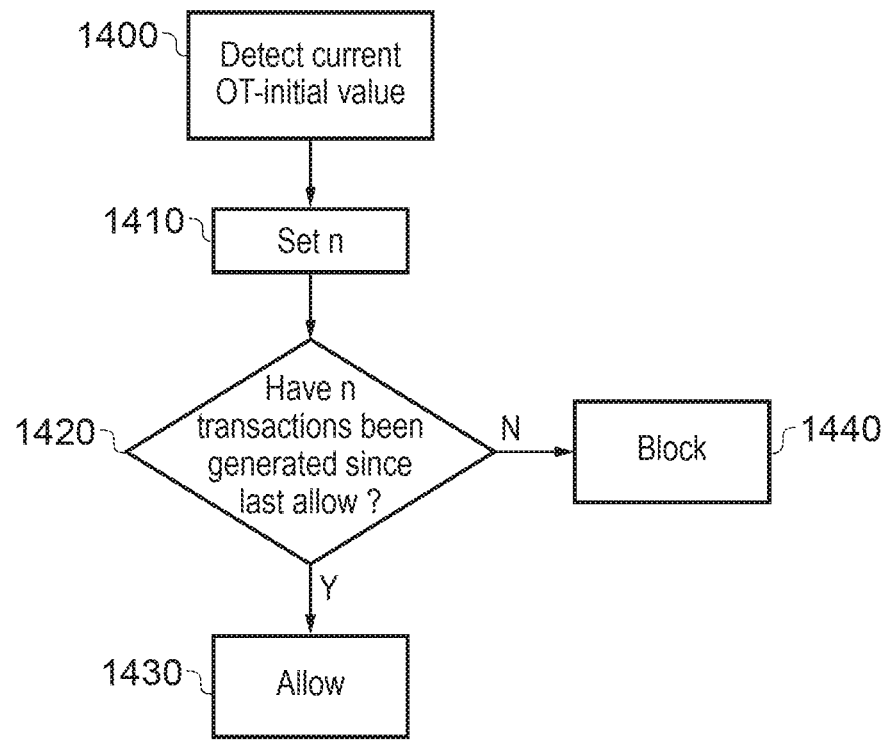
FIGS. 14 to 16 are schematic flowcharts illustrating methods.

FIG. 14 is a schematic flowchart illustrating the operation of the OT controller of FIG. 11 in the case that a permission is no longer received but the number of OTs is above OT limit.

At a step 1400, the current OT value is compared with OT limit and the difference is detected. At a step 1410, a counter value n is set according to the detected difference at the step 1400.

At a step 1420, a detection is made as to whether n transactions have been generated since the last one was allowed (where n is derived as discussed above). If the answer is yes then at a step 1430 the current transaction is allowed, whereas if the answer is no then at a step 1440 the current transaction is blocked.

FIG. 14 therefore provides an example in which the regulator circuitry is configured to change the limit with respect to an initial limit value; and when the number of outstanding transactions is above the initial limit value and the downstream device has not issued an authorisation, the transaction issuing device is configured to issue a next transaction in response to receipt of n successive completion acknowledgements, where n is greater than one.

Figure 15:
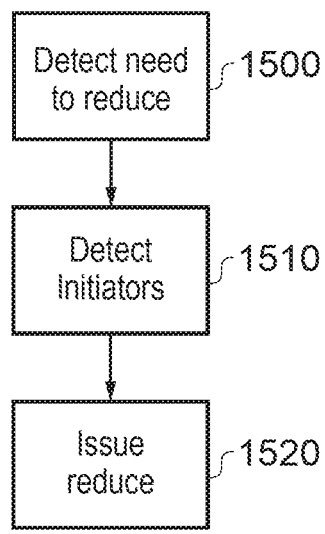

Referring to FIG. 15, at a step 1500 the need to reduce the number of outstanding transactions is detected by, for example, the circuitry of FIG. 13, and at a step 1510 one or more candidate transaction issuing devices to have their limits reduced are detected, for example being any which have indicated a willingness to reduce, as discussed above. In other words, the downstream device is configured to send the authorisation to one or more of those transaction issuing devices which have issued a request to increase in the limit applicable to outstanding transactions issued by that transaction issuing device. At a step 1520 a command is issued by a permission indication on a transaction response to reduce the OT number at the detected transaction issuing devices.

Figure 16:
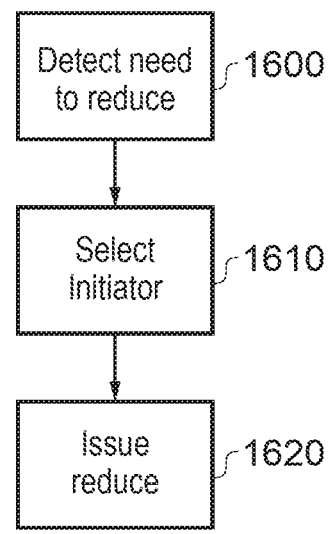

Similarly, in FIG. 16, a need to reduce a number of outstanding transactions is detected at a step 1600 and a transaction issuing device (or more than one) is selected at a step 1610. An instruction to reduce the OT number is issued at a step 1620 as before.

The flowcharts of FIGS. 15 and 16 are also applicable to the options that a server or adaptor can indicate to an OT regulator that it must change (for example, reduce, or in other examples increase) its OT number, or that it can change (for example, reduce, or in other examples, increase) its OT number. Either of these is an example of an authorisation of a change by the transaction regulator circuitry of the limit applicable to outstanding transactions by that transaction issuing device.

Figure 17:
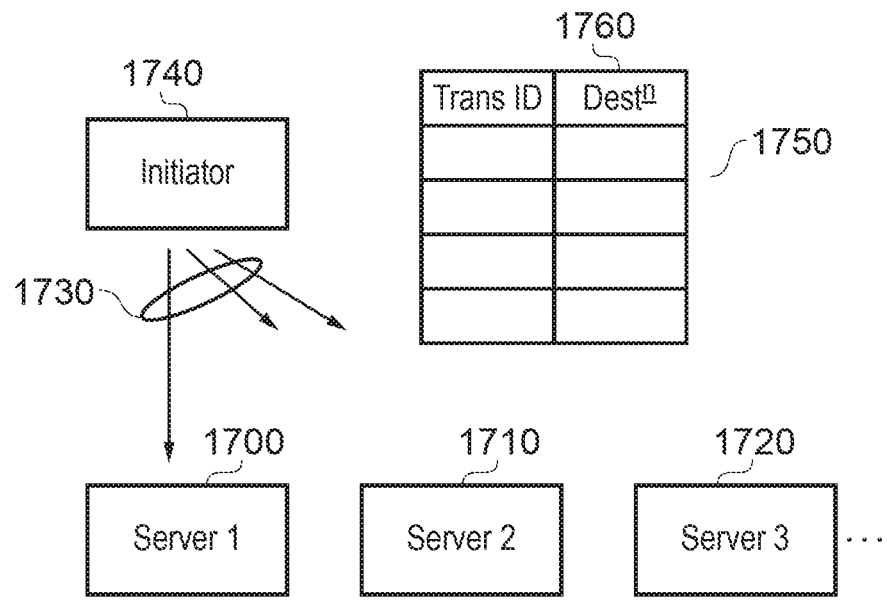
FIG. 17 schematically illustrates a transaction issuing device in communication with multiple downstream devices.

FIG. 17 schematically illustrates a transaction issuing device in communication with multiple downstream devices such as multiple servers 1700, 1710, 1720 via respective communication routes 1730.

The transaction issuing device 1740, or interconnect or other circuitry associated with the transaction issuing device, maintains a schedule 1750 associating transaction IDs with an identifier 1760 of the server to which that transaction relates. Different OT limits can be maintained in respect of each destination and controlled by OT control circuitry at the respective destinations. The initiator 1740 can comprise multiple OT regulators of the type discussed above, each applicable to respective ones (or groups) of the servers 1700 . . . 1720.

Figure 18:
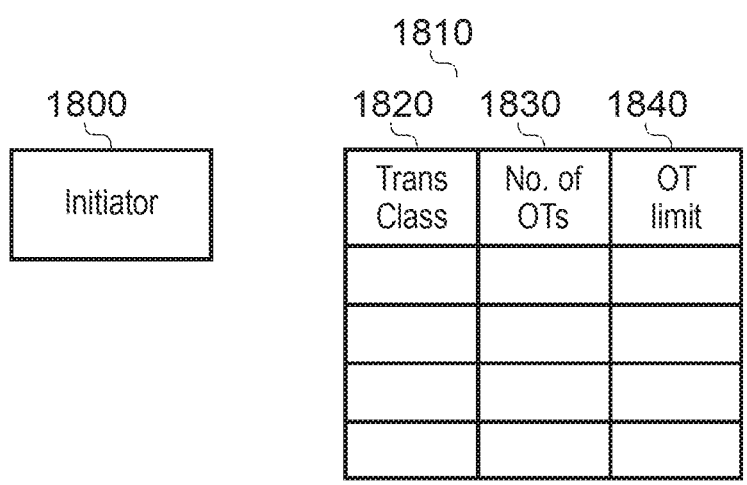
FIG. 18 schematically illustrates a transaction issuing device having multiple categories of transaction.

More generally, FIG. 18 schematically illustrates a transaction issuing device 1800 maintaining data 1810 indicative of different classes of transaction identified by a transaction class 1820. Each transaction class is associated with a current number of outstanding transactions 1830 and one or more respective OT limit values 1840. This provides an example in which the one or more transaction issuing devices are configured to issue transactions relating to a transaction category selected from a group of two or more transaction categories; and the indication is applicable to a limit relating to a subset of the transaction categories.

Figure 19:
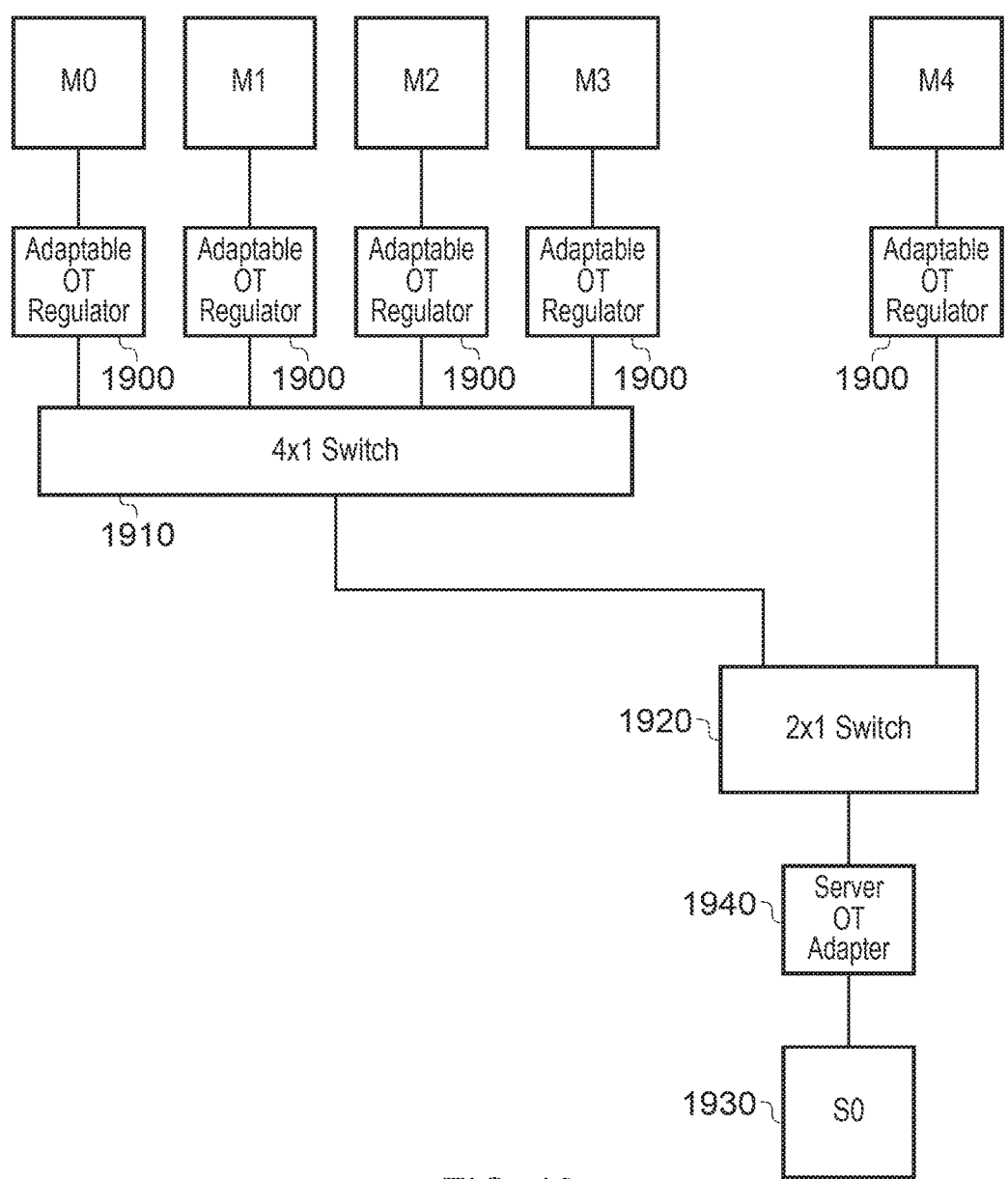
FIG. 19 schematically illustrates an example system.

FIG. 19 schematically illustrates an example system having five initiators M0 . . . M4, each having an associated OT regulator 1900 of the type discussed above. Transactions from the initiators M0 . . . M3 are combined by a four-way switch 1910 and are then combined by a two-way switch with transactions from the initiator M4.

A server S0 1930 has a server OT adaptor 1940 in communication with each of the OT regulators to control the OT limits as discussed above.

Figure 20:
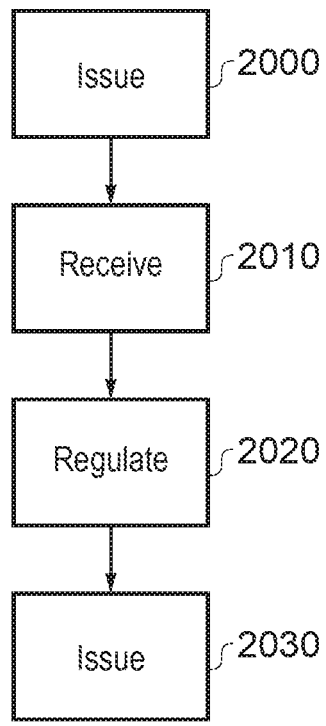
FIGS. 20 to 22 are schematic flowcharts illustrating methods.

FIG. 20 is a schematic flowchart illustrating a data processing method comprising:

one or more transaction issuing devices issuing (at a step 2000) data processing transactions to be handled by a downstream device and receiving (at a step 2010) a completion acknowledgement in respect of each completed transaction;

regulating (at a step 2020) transactions by allowing the issue of transactions subject to a limit on a maximum number of outstanding transactions, an outstanding transaction being a transaction which has been issued but for which a completion acknowledgement has not yet been received; and the downstream device issuing (at a step 2030) an indication to a transaction issuing device, to authorise a change by the transaction regulator circuitry of the limit applicable to outstanding transactions by that transaction issuing device.

Figure 21:
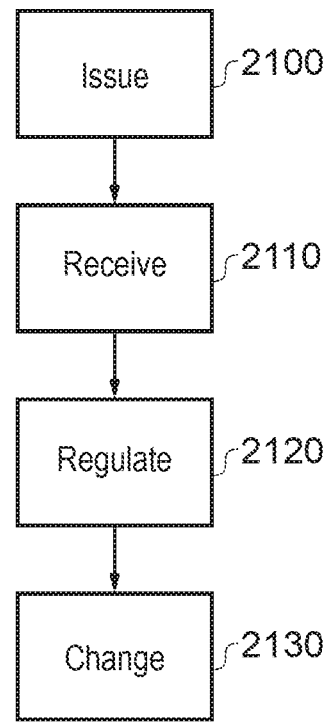

FIG. 21 is a schematic flowchart illustrating a method of operation of a transaction issuing device, comprising:

issuing (at a step 2100) data processing transactions to be handled by a downstream device and receiving a completion acknowledgement in respect of each completed transaction;

regulating (at a step 2110) transactions by allowing the transaction issuing device to issue transactions subject to a limit on a maximum number of outstanding transactions, an outstanding transaction being a transaction which has been issued but for which a completion acknowledgement has not yet been received; and changing (at a step 2120) the limit applicable to outstanding transactions by that transaction issuing device in response to receipt of an indication from the downstream device authorising the change.

Figure 22:
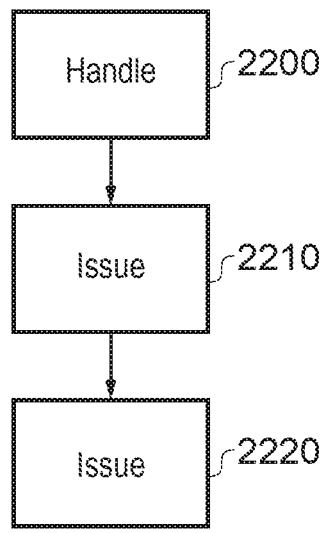

FIG. 22 is a schematic flowchart illustrating a method of operation of a device, comprising:

handling (at a step 2200) data processing transactions from a transaction issuing device;

issuing (at a step 2210) a completion acknowledgement in respect of each completed transaction; and issuing (at a step 2220) an indication to a transaction issuing device, to authorise a change by the transaction regulator circuitry of a limit applicable to outstanding transactions by that transaction issuing device.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Data processing apparatus comprising:
one or more transaction issuing devices configured to issue data processing transactions to be handled by a downstream device and to receive a completion acknowledgement in respect of each completed transaction;
each transaction issuing device having associated transaction regulator circuitry configured to allow that transaction issuing device to issue transactions subject to a limit on a maximum number of outstanding transactions, an outstanding transaction being a transaction which has been issued but for which a completion acknowledgement has not yet been received, in which, when the number of outstanding transactions is equal to the limit, the transaction issuing device is configured to issue a next transaction in response to receipt of a completion acknowledgment;
in which the downstream device is configured to issue an indication to a transaction issuing device, to authorise a change by the transaction regulator circuitry of the limit applicable to outstanding transactions by that transaction issuing device; and in which the indication comprises an authorisation for the transaction regulator circuitry to increase the limit applicable to outstanding transactions by that transaction issuing device and each transaction issuing device is configured to issue a request to the downstream device, to request an increase in the limit applicable to outstanding transactions issued by that transaction issuing device.

2. Apparatus according to claim 1, comprising two or more transaction issuing devices; in which the downstream device comprises:

a transaction buffer to store transactions which have been received from the two or more transaction issuing devices but which have not yet been completed; and detection circuitry to detect the occupancy of the transaction buffer;

in which the downstream device is configured to issue an indication to the at least one transaction issuing device in response to the detected occupancy of the transaction buffer.

3. Apparatus according to claim 1, in which the authorisation is indicative of an increment of a current limit applicable to outstanding transactions by that transaction issuing device.

4. Apparatus according to claim 1, in which the transaction regulator circuitry associated with a transaction issuing device is configured to increase the limit applicable to outstanding transactions by that transaction issuing device subject to a maximum limit value.

5. Apparatus according to claim 1, in which the transaction regulator circuitry associated with a transaction issuing device is configured to increase the limit applicable to outstanding transactions by that transaction issuing device when the number of outstanding transactions is equal to a current limit.

6. Apparatus according to claim 1, in which the transaction regulator circuitry associated with a transaction issuing device is configured to increase the limit applicable to outstanding transactions by that transaction issuing device in response to an authorisation received since initiation of a preceding transaction.

7. Apparatus according to claim 1, in which the downstream device is configured to issue a message to a transaction issuing device comprising a completion acknowledgement and the authorisation to increase the limit.

8. Apparatus according to claim 1, in which the downstream device is configured to send the authorisation to one or more of those transaction issuing devices which have issued a request to increase in the limit applicable to outstanding transactions issued by that transaction issuing device.

9. Apparatus according to claim 1, in which the transaction issuing devices are configured to issue the request as part of a message initiating a transaction.

10. Apparatus according to claim 1, in which the transaction regulator circuitry is configured to change the limit with respect to an initial limit value; and when the number of outstanding transactions is above the initial limit value and the downstream device has not issued an authorisation, the transaction issuing device is configured to issue a next transaction in response to receipt of n successive completion acknowledgements, where n is greater than one.

11. Apparatus according to claim 10, in which the value of n is dependent upon a difference between a current number of outstanding transactions and the initial limit value.

12. Apparatus according to claim 1, in which:

the one or more transaction issuing devices are configured to issue transactions relating to a transaction category selected from a group of two or more transaction categories; and the indication is applicable to a limit relating to a subset of the transaction categories.

13. Apparatus according to claim 1, in which the indication comprises a request for the regulator circuitry to reduce the limit applicable to outstanding transactions by that transaction issuing device.

14. Apparatus according to claim 13, in which the regulator circuitry is configured to respond to the request when the number of outstanding transactions by that transaction issuing device is above a minimum threshold.

15. Apparatus according to claim 14, in which the transaction issuing device is configured to indicate to the downstream device that it is able to reduce the limit applicable to outstanding transactions by that transaction issuing device when the number of outstanding transactions by that transaction issuing device is above the minimum threshold.

16. Apparatus according to claim 1, in which the downstream device is selected from the list consisting of: (i) a server device; and (ii) an interconnect.

17. Apparatus according to claim 16, in which the downstream device is selected from the list consisting of:

(i) a memory device configured to handle a transaction by reading from or writing to one or more memory addresses; and (ii) an interconnect configured to buffer a transaction and configured to handle the transaction by forwarding the transaction from the buffer to another downstream device.

18. A transaction issuing device comprising:

circuitry to issue data processing transactions to be handled by a downstream device and to receive a completion acknowledgement in respect of each completed transaction; and transaction regulator circuitry to allow that transaction issuing device to issue transactions subject to a limit on a maximum number of outstanding transactions, an outstanding transaction being a transaction which has been issued but for which a completion acknowledgement has not yet been received, in which, when the number of outstanding transaction is equal to the limit, the transaction issuing device is configured to issue a next transaction in response to receipt of a completion acknowledgement;

in which the transaction issuing device is configured to issue a request to the downstream device, to request an increase in the limit applicable to outstanding transactions issued by that transaction issuing device; and in which the transaction regulator circuitry is configured to change the limit applicable to outstanding transactions by that transaction issuing device in response to receipt of an indication from the downstream device authorising the change.

19. A device comprising:

circuitry to handle data processing transactions from a transaction issuing device having associated transaction regulator circuitry and to issue a completion acknowledgement in respect of each completed transaction; and circuitry, responsive to a request issued by the transaction issuing device to the device, to request an increase in the limit applicable to outstanding transactions issued by that transaction issuing device, to issue an indication to the transaction issuing device, to authorise a change by the transaction regulator circuitry of a limit applicable to outstanding transactions by the transaction issuing device.

20. A data processing method comprising:

one or more transaction issuing devices issuing data processing transactions to be handled by a downstream device and receiving a completion acknowledgement in respect of each completed transaction;

transaction regulator circuitry regulating transactions by allowing the issue of transactions subject to a limit on a maximum number of outstanding transactions, an outstanding transaction being a transaction which has been issued but for which a completion acknowledgement has not yet been received, in which, when the number of outstanding transaction is equal to the limit, the transaction issuing device is configured to issue a next transaction in response to receipt of a completion acknowledgement;

a transaction issuing device of the one or more transaction issuing devices issuing a request to the downstream device, to request an increase in the limit applicable to outstanding transactions issued by that transaction issuing device; and the downstream device issuing an indication to the transaction issuing device, to authorise a change by the transaction regulator circuitry of the limit applicable to outstanding transactions by the transaction issuing device, in which the indication comprises an authorisation for the transaction regulator circuitry to increase the limit applicable to outstanding transactions by the transaction issuing device.

21. A method of operation of a transaction issuing device, comprising:

issuing data processing transactions to be handled by a downstream device and receiving a completion acknowledgement in respect of each completed transaction;

regulating transactions by allowing the transaction issuing device to issue transactions subject to a limit on a maximum number of outstanding transactions, an outstanding transaction being a transaction which has been issued but for which a completion acknowledgement has not yet been received, the regulation step comprising, when the number of outstanding transaction is equal to the limit, allowing the transaction issuing device to issue a next transaction in response to receipt of a completion acknowledgement;

issuing a request to the downstream device, to request an increase in the limit applicable to outstanding transactions issued by that transaction issuing device; and changing the limit applicable to outstanding transactions by that transaction issuing device in response to receipt of an indication from the downstream device authorising the change.

22. A method of operation of a device, comprising:

handling data processing transactions from a transaction issuing device having associated transaction regulator circuitry;

issuing a completion acknowledgement in respect of each completed transaction; and issuing, responsive to a request issued by the transaction issuing device to the device, to request an increase in the limit applicable to outstanding transactions issued by that transaction issuing device, an indication to that transaction issuing device, to authorise a change by the transaction regulator circuitry of a limit applicable to outstanding transactions by that transaction issuing device.

* * * * *